(12) United States Patent
Walter et al.

(10) Patent No.: US 11,079,015 B2
(45) Date of Patent: Aug. 3, 2021

(54) TRANSMISSION HAVING TORQUE MEASUREMENT DEVICE

(71) Applicant: Schaeffler Technologies AG & Co. KG, Herzogenaurach (DE)

(72) Inventors: Bernhard Walter, Oberkirch-Haslach (DE); Sebastian Kopfler, Buhl (DE); Reinhard Stehr, Buhl (DE)

(73) Assignee: SCHAEFFLER TECHNOLOGIES AG & CO KG, Herzogenaurach (DE)

( * ) Notice: Subject to any disclaimer, the term of this patent is extended or adjusted under 35 U.S.C. 154(b) by 272 days.

(21) Appl. No.: 16/320,274

(22) PCT Filed: Sep. 12, 2017

(86) PCT No.: PCT/DE2017/100767
§ 371 (c)(1),
(2) Date: Jan. 24, 2019

(87) PCT Pub. No.: WO2018/059618
PCT Pub. Date: Apr. 5, 2018

(65) Prior Publication Data
US 2019/0264806 A1   Aug. 29, 2019

(30) Foreign Application Priority Data
Sep. 29, 2016  (DE) .......................... 102016218841.0

(51) Int. Cl.
| *F16H 61/662* | (2006.01) |
| *F16H 9/18* | (2006.01) |
| *F16H 61/00* | (2006.01) |
| *G01L 3/00* | (2006.01) |
| *F16H 59/14* | (2006.01) |

(52) U.S. Cl.
CPC ........... *F16H 61/6625* (2013.01); *F16H 9/18* (2013.01); *F16H 59/14* (2013.01); *F16H 61/0006* (2013.01); *F16H 61/662* (2013.01); *G01L 3/00* (2013.01); *F16H 2059/147* (2013.01)

(58) Field of Classification Search
CPC ..... G01L 3/00; G01L 3/04; G01L 3/14; G01L 3/12; G01L 3/102; G01L 3/103; G01L 3/105; G01L 3/108
USPC .......................................................... 474/8
See application file for complete search history.

(56) References Cited

U.S. PATENT DOCUMENTS 3,619,612 A * 11/1971 Belke .................... G01K 1/024
250/349
3,861,206 A * 1/1975 Kawafune ............... G01L 3/105
324/209

(Continued)

FOREIGN PATENT DOCUMENTS

| CN | 1853207 | 10/2006 |
| DE | 102013204924 | 9/2014 |

(Continued)

*Primary Examiner* — Henry Y Liu
(74) *Attorney, Agent, or Firm* — Volpe Koenig

(57) ABSTRACT

The invention relates to a transmission for a drive train of a motor vehicle, having a shaft section, to which a torque measurement device, designed to measure a torque applied to the shaft section is attached, wherein an electronics unit connected to the torque measurement device is received radially within the shaft section. The invention further relates to a drive train for a motor vehicle, having a transmission.

17 Claims, 2 Drawing Sheets

(56) References Cited

U.S. PATENT DOCUMENTS

| | | | | | |
|---|---|---|---|---|---|
| 3,938,890 | A * | 2/1976 | Flavell | G01L 3/12 | 356/370 |
| 4,523,482 | A * | 6/1985 | Barkhoudarian | G01L 3/103 | 324/209 |
| 4,572,005 | A * | 2/1986 | Kita | G01L 3/105 | 324/209 |
| 4,731,044 | A * | 3/1988 | Mott | F16H 61/66272 | 474/8 |
| 4,829,834 | A * | 5/1989 | Masom | G01P 1/026 | 73/862.326 |
| 4,890,501 | A * | 1/1990 | Schumacher | G01L 3/106 | 310/68 B |
| 4,899,598 | A * | 2/1990 | Gumaste | G01L 3/102 | 73/862.335 |
| 4,909,088 | A * | 3/1990 | Tsais | G01L 3/102 | 73/862.335 |
| 5,146,790 | A * | 9/1992 | Fish | G01L 3/102 | 324/209 |
| 5,297,439 | A * | 3/1994 | Tyren | G01L 3/102 | 324/209 |
| 5,351,555 | A * | 10/1994 | Garshelis | G01L 3/102 | 336/30 |
| 5,431,063 | A * | 7/1995 | Yasui | G01D 5/48 | 73/779 |
| 5,585,571 | A * | 12/1996 | Lonsdale | G01L 1/165 | 73/862.321 |
| 6,359,409 | B1 * | 3/2002 | Siraky | G01D 5/34715 | 250/231.13 |
| 6,776,058 | B1 * | 8/2004 | Schroeder | G01L 3/104 | 73/862.333 |
| 6,792,817 | B2 * | 9/2004 | Viola | H01F 13/003 | 73/862.335 |
| 6,857,500 | B2 * | 2/2005 | Halstead | G01L 5/221 | 180/446 |
| 6,948,381 | B1 * | 9/2005 | Discenzo | G01L 3/12 | 73/800 |
| 7,095,198 | B1 * | 8/2006 | O'Brien | G01L 3/242 | 318/432 |
| 7,201,044 | B1 * | 4/2007 | Bunyer | G01L 3/1428 | 73/114.15 |
| 7,264,564 | B2 * | 9/2007 | Walter | F16H 55/56 | 474/18 |
| 7,293,476 | B2 * | 11/2007 | Gierut | G01L 3/101 | 73/862.335 |
| 7,307,517 | B2 * | 12/2007 | Liu | G01L 3/10 | 340/441 |
| 7,586,083 | B2 * | 9/2009 | Vahabzadeh | G01D 5/344 | 250/225 |
| 7,612,665 | B2 * | 11/2009 | Okada | F16C 19/52 | 340/442 |
| 7,886,863 | B2 * | 2/2011 | Marsh | G01L 3/103 | 180/383 |
| 8,109,847 | B2 * | 2/2012 | Reuschel | F16H 55/56 | 474/18 |
| 8,720,284 | B2 * | 5/2014 | Talikoti | G01D 5/3473 | 73/862.324 |
| 8,798,877 | B2 * | 8/2014 | Ayabe | F16H 61/66259 | 701/51 |
| 9,097,598 | B2 * | 8/2015 | Grassi | G01L 3/04 | |
| 9,341,525 | B2 * | 5/2016 | Kim | G01L 3/08 | |
| 2006/0037410 | A1 * | 2/2006 | Gierut | G01L 3/101 | 73/862.335 |
| 2007/0000336 | A1 * | 1/2007 | Berdichevsky | G01L 3/1442 | 73/862.324 |
| 2007/0030134 | A1 * | 2/2007 | Liu | G01L 3/10 | 340/441 |
| 2008/0156972 | A1 * | 7/2008 | Vahabzadeh | G01L 3/12 | 250/231.13 |
| 2008/0234092 | A1 * | 9/2008 | Ishii | B60K 23/08 | 475/275 |
| 2008/0268991 | A1 * | 10/2008 | Walter | F16H 55/56 | 474/12 |
| 2009/0230953 | A1 * | 9/2009 | Lee | G01R 33/07 | 324/244 |
| 2010/0062884 | A1 * | 3/2010 | Tay | F16H 9/08 | 474/25 |
| 2010/0269646 | A1 * | 10/2010 | Le Du | B25B 21/00 | 81/478 |
| 2011/0000320 | A1 * | 1/2011 | Delatorre | G01L 3/1457 | 73/862.338 |
| 2011/0082002 | A1 * | 4/2011 | Heath | F16H 37/021 | 475/198 |
| 2011/0152019 | A1 * | 6/2011 | Gantner | F16H 9/24 | 474/8 |
| 2012/0051680 | A1 * | 3/2012 | Ishikawa | F16C 33/427 | 384/462 |
| 2012/0297895 | A1 * | 11/2012 | Kapas | G01L 3/102 | 73/862.193 |
| 2012/0325507 | A1 * | 12/2012 | Fluhrer | G01L 5/24 | 173/20 |
| 2013/0024137 | A1 * | 1/2013 | Grassi | G01L 3/04 | 702/43 |
| 2014/0069759 | A1 * | 3/2014 | Pietron | F16H 61/061 | 192/3.55 |
| 2015/0020611 | A1 * | 1/2015 | Kim | G01L 3/08 | 73/862.191 |
| 2015/0176702 | A1 * | 6/2015 | Kelly | F16D 11/10 | 74/337 |
| 2015/0308565 | A1 * | 10/2015 | Sbog rd | F16H 59/16 | 701/51 |
| 2016/0209280 | A1 * | 7/2016 | Brevick | G01L 3/102 | |
| 2016/0280321 | A1 * | 9/2016 | Yamamoto | B62M 6/55 | |
| 2017/0313318 | A1 * | 11/2017 | Heindl | B60W 30/18172 | |
| 2017/0313379 | A1 * | 11/2017 | Gao | G01L 5/225 | |
| 2019/0331203 | A1 * | 10/2019 | Mei | G01L 3/04 | |

FOREIGN PATENT DOCUMENTS

| | | |
|---|---|---|
| DE | 102013207864 | 10/2014 |
| EP | 0228199 | 7/1987 |
| WO | 2016050241 | 4/2016 |
| WO | 2016065501 | 5/2016 |

* cited by examiner

TRANSMISSION HAVING TORQUE MEASUREMENT DEVICE

BACKGROUND

The invention relates to a transmission for a drivetrain of a motor vehicle, such as a passenger car, truck, bus, or other commercial vehicle, with a shaft section on which is mounted a torque measurement device that is designed for measuring a torque applied to this shaft section. The invention also relates to a drivetrain with this transmission.

Transmissions according to this class have been known for a long time from the prior art. In this context, e.g., EP 0 228 199 A2 discloses a tension sensor and a control arrangement for a CVT transmission.

Additional prior art is disclosed with WO 2016/050 241 A1, which shows a device for detecting a torque applied to a rotatably supported component. DE 10 2013 204 924 A1 shows a very similar construction for measuring a torque acting on a steering control shaft.

In CVT transmissions, the engine torque signal MMI is often used for the torque-related contact pressure between the respective drive and driven plate pairs. This signal, however, is relatively imprecise, especially in partial load operation. An excessive contact pressure between the individual plates of the drive and driven plate pair negatively affects, in turn, the transmission efficiency indirectly and unnecessarily increases the pump power consumption. However, the torque sensors previously used as an alternative for this purpose, especially torque sensors using hydraulic-mechanical effects, are associated with disadvantages with respect to the axial installation space and the high manufacturing expense.

SUMMARY

Therefore, the objective of the present invention is to eliminate the disadvantages known from the prior art and, in particular, to provide a transmission that is to be individually adjustable as much as possible to the respective operating state of the drivetrain, wherein simultaneously the use of installation space and the manufacturing expense of the transmission are to be further improved.

This objective is achieved according to the invention in that an electronics unit connected to the torque measurement device is mounted radially inside the shaft section.

By providing this torque measurement device, the installation space of the transmission is utilized more intensely or alternatively the installation space can even be reduced in comparison with known solutions. In addition, due to the close spatial arrangement of the electronics unit to the torque measurement device, the measurement accuracy is further increased. On the other hand, such a shaft section can be produced in an especially cost-effective way and can be easily installed during assembly.

Additional advantageous embodiments are explained in more detail below.

It is also advantageous if the transmission is a continuously variable transmission (also called CVT) that preferably has a drive plate pair and a driven plate pair that are actively interconnected by an endless traction mechanism, wherein the shaft section is then locked in rotation preferably with a (first) plate of the drive plate pair. In this way, the shaft section has an especially effective effect.

The torque transmitted by the shaft section during operation is used, in particular, for controlling the contact pressure forces, e.g., in the transmission, preferably the continuously variable transmission, in clutches, in converters, brakes, etc.

If the electronics unit is mounted/fastened onto a radial inner circumferential surface of the shaft section, the required installation space outside of the shaft section is further reduced. This is because the shaft section and its torque measurement device and electronics unit then form one module that is integrated into the transmission in the fewest possible work steps.

If the electronics unit has evaluation electronics that convert a measurement signal detected by the torque measurement device and corresponding to a torque applied to the shaft section/the (first) plate of the drive plate pair into a data transmission signal to be transmitted, the accuracy of the data transmission and the subsequent evaluation is further improved.

In addition, it is useful if the torque measurement device is, in turn, attached to a radial outer side of the shaft section and connected electrically to the electronics unit, preferably by a connecting line running in the radial direction. Thus, a direct electrical connection is implemented between the electronics unit and the torque measurement device.

If the torque measurement device has a strain measurement layer/strain-sensitive coating, which is preferably mounted directly on the radial outer side of the shaft section or, more preferred, on a sleeve formed separate to the shaft section but locked in rotation on the shaft section, the torque measurement device has an especially effective design.

If the shaft section has a tubular component that is preferably locked in rotation/connected to a gear shaft, preferably a transmission input shaft, a sub-gear unit, more preferably a planetary gear device, the shaft section is used in an especially clever and space-saving way preferably as an integral component of a driveshaft. The shaft section is used for forming the transmission as a continuously variable transmission in that the (first) plate of the drive plate pair is locked in rotation with a gear shaft.

In this context, it is also useful if the shaft section has a first tooth section (preferably in the form of a spline/serration) that engages locked in rotation with first mating teeth on the (first) plate and/or a second tooth section (preferably formed, in turn, as a spline/serration) that engages locked in rotation with second mating teeth on the gear shaft (preferably formed as an output rotating part, for example, a sun gear of the planetary gear device). In this way, the installation space of the transmission is used even more efficiently.

If a data transmission unit arranged between a housing and the shaft section that can rotate relative to the housing is connected to the electronics unit, the electronics unit can be connected in an especially clever way in operation with a central control unit of the motor vehicle.

In this context, it is especially advantageous if the data transmission unit has a bearing formed for transmitting data, preferably a roller bearing formed for transmitting data. In this way, data transmission can take place in an especially space-saving way.

Here it is also advantageous if the bearing formed for data transmission has a first bearing ring (preferably a bearing inner ring) that is locked in rotation with the (first) plate. With a second bearing ring (bearing outer ring) that can rotate relative to the first bearing ring in the bearing formed for transmitting data, the first bearing ring is then more preferably connected in a data-transmitting way, e.g., a non-contact way (by a rotor and stator antenna).

It is also advantageous if a first antenna element (rotor antenna) arranged on the first bearing ring is connected to the electronics unit in an electrical connection running in the radial direction. In this way, the space-saving construction of the transmission is further improved.

In this way, the electronics unit is connected to a central control unit by the data transmission unit that has at least the bearing formed for transmitting data and an electrical connection in a data-transmitting way, preferably also an energy-transmitting way, in the operating state of the transmission.

In addition, the invention relates to a drivetrain for a motor vehicle with such a transmission. In this way, the drivetrain also has an especially efficient design.

In other words, an electronic torque measurement is implemented in this way for determining a contact pressure force in a CVT unit. A torque measurement unit (torque measurement device) is proposed in which the measurement position and the necessary electronic components (electronics unit) are integrated inside the driveshaft (shaft section). The measurement principle is based on a strain-sensitive coating (strain measurement layer), preferably a Schaeffler Sensotect® coating. The data transmission unit is here a bearing of the CVT drive unit/transmission, which is arranged coaxial to the tubular component (shaft section) of the torque measurement unit.

BRIEF DESCRIPTION OF THE DRAWINGS

The invention will now be described in more detail below with reference to the figures, in which context different embodiments will also be explained in principle. Shown are.

DETAILED DESCRIPTION

Figure 1:
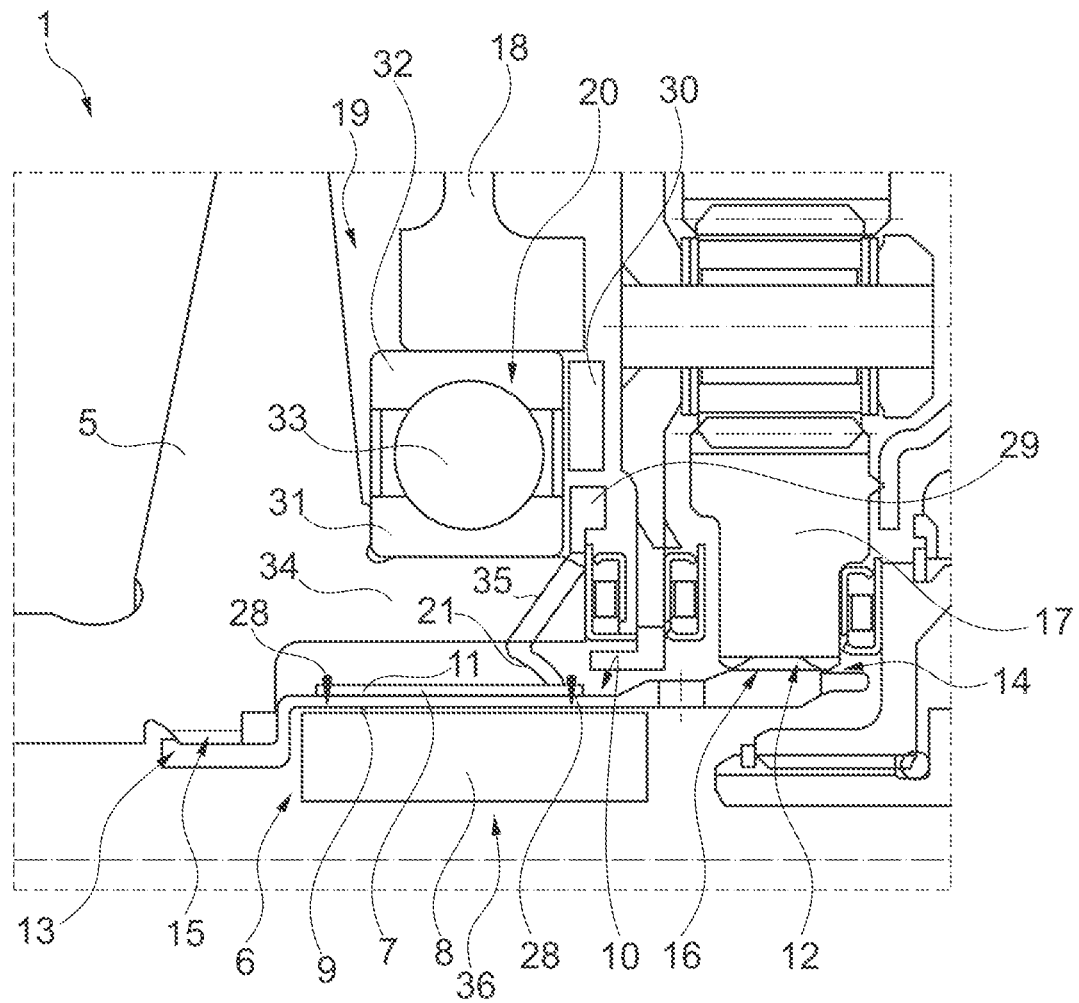
FIG. 1 a detailed longitudinal sectional view of a continuously variable transmission according to the invention according to a preferred embodiment, wherein, in particular, an area can be seen between a first plate of a drive plate pair and a planetary gear device of the transmission coupled with the first plate via a shaft section, and FIG. 2 a longitudinal sectional view of a continuously variable transmission according to the state of the art, wherein this transmission is constructed in its basic design similar to the continuously variable transmission according to the invention from FIG. 1.

The figures are only of a schematic nature and are to be used only for understanding the invention. Identical elements are provided with identical reference symbols.

In connection with FIG. 1, the construction of a continuously variable transmission 1 according to the invention described below is described in detail according to a preferred embodiment. The continuously variable transmission 1 (also called CVT unit) corresponds in its basic design and in its basic functioning to the variable transmissions already known from the prior art. As an example, a continuously variable transmission 1' from the prior art is shown in FIG. 2. The continuously variable transmission 1' of the prior art typically has, like the transmission 1 according to the embodiment according to the invention, which, however, for the sake of clarity cannot be seen completely in FIG. 1, a drive plate pair 2 and a driven plate pair 3. The drive plate pair 2 is locked in rotation with the driven plate pair 3 by an endless traction mechanism 4 mounted so that it can move relative to these plate pairs 2 and 3.

The drive plate pair 2 is locked in rotation in FIG. 2 indirectly, as described in more detail below by a planetary gear device 12, with a drive shaft 22. In particular, a first plate 5 of the drive plate pair 2 is coupled with the drive shaft 22 (by the planetary gear device 12). A second plate 23 of the drive plate pair 2 is supported so that it can move in the axial direction relative to the first plate 5. Both plates 5 and 23 together form the drive plate pair 2. In particular, both plates 5 and 23 have conical contact surfaces facing each other in the axial direction of the drive shaft 22. The contact surfaces of the plates 5 and 23 run in the radial direction of the drive shaft 22 conically outward such that the axial distance between the contact surfaces of the plates 5 and 23 increases in the radial direction. The endless traction mechanism 4 is pressed onto the contact surfaces at a certain radial height, forming a friction-fit connection, as a function of the axial distance between the first plate 5 and the second plate 23.

The driven plate pair 3, as can also be seen in FIG. 2, has a similar construction and function with respect to the drive plate pair 2. The driven plate pair 3 also has two plates, namely a first plate 24 and a second plate 25. The plates 24 and 25 are locked in rotation with a driven shaft 26. In particular, the first plate 24 of the driven plate pair 3 has a materially integrated construction with the driven shaft 26. The material integration, however, is not mandatory. In other constructions, the first plate 24 is also mounted by a shrink-fitting or contact-pressing procedure.

The second plate 25 of the driven plate pair 3 is arranged so that it can move in the axial direction relative to the first plate 24. Conical contact surfaces facing each other in the two plates 24 and 25 interact, in turn, with the endless traction mechanism 4, forming a friction-fit connection. The respective relative position of the second plates 23 or 25 to the first plates 5 or 24 defines the gear ratio of the variable transmission 1', 1. The driven shaft 26 is then typically connected to the wheels of the motor vehicle by several other teeth steps and a differential 27 of the drivetrain.

Figure 2:
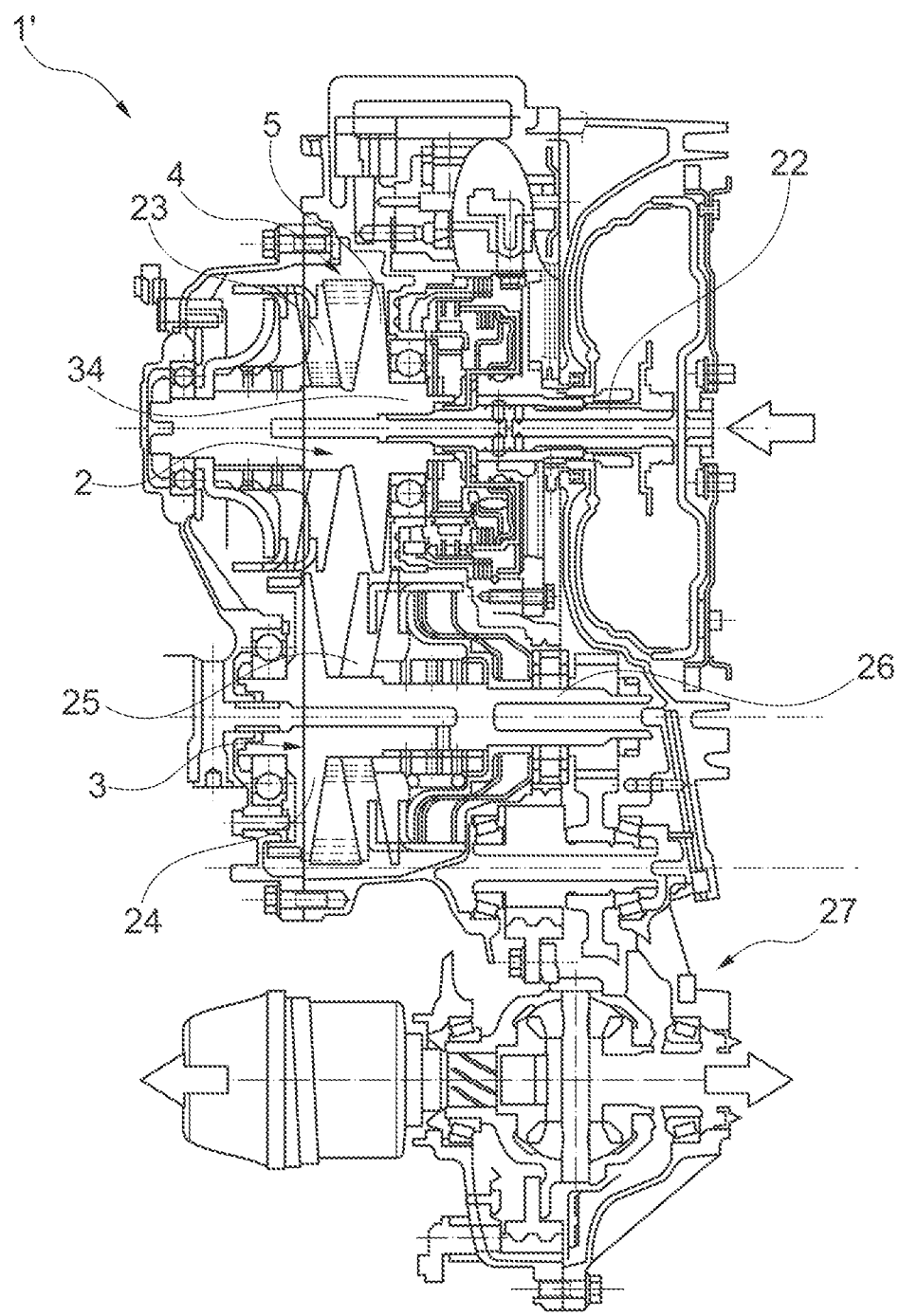

In FIG. 1, in particular, the differences of the transmission 1 according to the invention compared with the transmission 1' from FIG. 2 can be seen.

The transmission 1 is shown in FIG. 1 in the area between the first plate 5 and a planetary gear/planetary gear device 12 of the transmission 1. In particular, a shaft section 6 according to the invention, which is locked in rotation on the first plate 5, is shown. The planetary gear device 12 represents a sub-gear unit of the transmission 1. The planetary gear device 12 can also be replaced in other constructions by other transmissions/sub-gear units.

The shaft section 6 is a tubular component that is constructed separately from the first plate 5/drive plate pair 2. The shaft section 6 is used as an additional drive shaft/connection shaft. In particular, the shaft section 6 is a relatively short/axial short-build section.

A torque measurement device 7 is mounted on the shaft section 6. This torque measurement device 7 has a strain measurement layer 11 that is connected rigidly to the shaft section 6. The strain measurement layer 11 is constructed in this embodiment in the form of a sleeve component constructed separately from the shaft section 6. The shaft section is fastened rigidly to the surface of the radial outer side 10 of the shaft section 6 (by multiple fasteners 28). The fasteners 28 can basically have different constructions, for example, welded or bonded connections, alternatively, however, fastener pins could also be used. In addition, the strain measurement layer 11 could alternatively also be constructed as a direct coating of the shaft section 6 and mounted as a (material-fit) layer on the outer side 10.

The torque measurement device 7 is always attached, together with its strain measurement layer 11, on the outer side 10 of the shaft section 6, so that it measures, in the operation of the transmission 1, a torque transmitted by the shaft section 6 (between the planetary gear device 12 and the first plate 5) and generates a measurement signal corresponding to the torque.

An electronic component/electronics unit 8 is also connected to the shaft section 6 for evaluating/converting the measurement signal of the torque measurement device 7. This electronics unit 8 is arranged on a radial inner side 36, namely a radial inner circumferential surface 9, of the shaft section 6. In particular, the electronics unit 8 is fastened/connected to this inner circumferential surface 9.

The electronics unit 8 has several electronic components/parts that form, at least partially, the evaluation electronics for the transmitted measurement signal of the torque measurement device 7. These evaluation electronics are designed to convert/change the measurement signal generated by the torque measurement device 7 into a data transmission signal suitable for data transmission. Here, the measurement signal that is detected directly by the torque measurement device 7 is processed/modulated accordingly, in order to generate the most exact possible data transmission signal that is forwarded, as described in more detail below, to the corresponding central control unit of the motor vehicle.

The torque measurement device 7 is connected in a data-transmitting and/or electrical way to the electronics unit 8 directly by the connecting line not shown in more detail here for the sake of clarity. Here, the electronics unit 8 is used both to construct a data connection with the torque measurement device 7 and maintain it during operation and also to supply electrical power to the torque measurement device 7. For example, strain gauge sections of the strain measurement layer 11 that are not shown for the sake of clarity are connected during operation to a constant power supply provided by the electronics unit 8, so that a bridge voltage changing with the strain/torque on the shaft section 6 is picked up. The connection line runs radially through the shaft section 6.

The electronics unit 8 is further connected, during operation, to a central control unit not shown in more detail here for the sake of clarity, for example, an engine control module, of the motor vehicle, for transmitting data and also for transmitting electrical power. For this purpose, a data transmission unit 19 is provided in the transmission 1.

The data transmission unit 19 has a bearing 20 in the form of a roller bearing, namely a ball bearing, which basically corresponds in its construction to the roller bearing disclosed in DE 10 2013 207 864 A1; therefore, the known construction is considered integrated herein in this context. The bearing 20, however, is not limited to the construction as a ball bearing. The bearing 20 is constructed for data transmission. In particular, the bearing 20 has, on one axial side, two antenna elements 29 and 30 that are in active electrical connection to each other and form a wireless/non-contact (antenna) connection. However, a loop contact device or a coil device could also be provided as an alternative here, then with two loop contact elements/coil elements on the bearing 20.

A first bearing ring 31, in the form of a bearing inner ring, of the bearing 20 is locked in rotation on the first plate 5 of the drive plate pair 2. A second bearing ring 32 of the bearing 20 is supported so that it can rotate via several roller bodies 33 relative to this first bearing ring 31. The second bearing ring 32 is locked in rotation on a housing 18 of the transmission 1 (also designated as transmission case/transmission bell housing).

A first antenna element 29/transmission element is mounted in the form of a rotor antenna on the first bearing ring 31 and is connected electrically to the electronics unit 8. A second antenna element 30/transmission element in the form of a stator antenna is mounted in an electrically conductive way on the second bearing ring 32. The two antenna elements 29 and 30 are connected continuously in a wireless way in the operating state, so that a continuous (rotational position-independent) antenna connection/data and/or energy connection is produced between the housing 18 and the electronics unit 8 during operation.

As can also be seen, the first bearing ring 31 is locked in rotation on a bearing journal 34 of the first plate 5, for example, by a type of splined key connection. This bearing journal 34 is penetrated in the radial direction by a connection channel 35 that is used for holding an electrical connection/connection line 21. The connection channel 35 can be realized by a hole as in FIG. 1 or preferably by a recess/indentation/groove that is formed in the end surface of the bearing journal 34 and in which the essentially radial connection line 21 is then inserted. The connection line 21 is connected electrically to the first antenna element 29 by a plug-in connection/connector receptacle on the first bearing ring 31.

The data transmission unit 19 is thus formed on one hand by the bearing 20, on the other hand by the electrically conductive material sections/components of the first plate 5 and the housing 18. The data transmission unit 19 is designed so that the electronics unit 8 is connected during operation to a central control unit, on one hand, for data transmission and, on the other hand, also for receiving electrical energy that is provided by the control unit (directly or indirectly).

It can also be seen in FIG. 1 that the shaft section 6 has a torque-transmitting section of the transmission 1. The shaft section 6 is mounted in the flow of torque of the transmission 1 between the planetary gear device 12 and the first plate 5. For the rotationally locked connection of the shaft section 6 to the first plate 5 or a transmission shaft 17 in the form of an output rotational part, namely a sun/sun gear, of the planetary gear device 12, the shaft section 6 has two tooth sections 13 and 14. Instead of the sun, another output rotational part of the planetary gear device 12, for example, a connecting piece, could also be connected to the shaft section 6 in this way. The output rotational part is also not absolutely part of the planetary gear device 12. The output rotational part can basically be part of any device changing direction of rotation. Sometimes, the device is also arranged downstream of the variator, then the measurement location is connected directly to the converter.

With a first tooth section 13 that is constructed in a first end area of the shaft section 6 on the radial outer side 10, first mating teeth 15 engages in a rotationally locked way on a radial inner side of the first plate 5. The tooth section 13 and mating teeth 15 together form a spline/serration. The second tooth section 14 is arranged on a second end area of the shaft section 6 opposite the first end area. The second tooth section 14 is also formed on the radial outer side 10 of the shaft section 6. Second mating teeth 16 of the gear shaft 17 engage, in turn, in a positive-fit connection in this second tooth section 14. Mating teeth 16 and tooth section 14 form a spline/serration. The torque measurement device 7 and electronics unit 8 are then arranged on the shaft section 6, in turn, axially between these two tooth sections 13 and 14.

In other words, according to the invention, a measurement location (the torque measurement device 7) is integrated in a relatively installation space neutral way in the area of a drive shaft 22 of a CVT unit 1. The non-positive-fit connection is realized by the planetary set/the planetary gear device 12 (for reversing the direction of rotation) by the torque measurement unit/device 7 on the first plate 5 of the CVT unit 1. For the torque measurement, a tubular component 6 is used. The measurement principle is based on strain and is enabled with the help of a strain-sensitive coating 11, preferably a Schaeffler Sensotect® coating. The sensor layer 11 thus can be either coated directly on the component 6 or attached with a material-fit connection on the component 6 in the form of a welded-on measurement sleeve. The required electronic components 8 are positioned inside the tubular component 6. In other embodiments, the electronics 8 can also be stored in a separate component between the bearing 20 and sensor layer 11. The measured signal is transmitted by a data transmission unit 19 from the rotating components to the signal-processing components that are spatially stationary with the transmission housing 18, in order to then be able to process the signal further. The data transmission unit 19 is here a bearing 20 of the CVT drive unit 1 that is positioned coaxial to the tubular component 6 of the torque measurement unit 7. The bearing 20 should be constructed here as disclosed in DE 10 2013 207 864 A1. The tubular component 6 is also constructed on its input and output side with a spline 13, 14, in order to connect the component easily to the connection partners. The signal connection from the tubular component 6 to the bearing inner ring 31 is realized by a cable connection 21 with a connector or alternatively by a connector-less connection (e.g., an adhesive, welded, and/or soldered connection). The bearing inner ring 31 is prevented from rotating relative to the gear shaft/first plate 5, e.g., with a type of splined key connection (the cable connection is therefore protected). The signal connection from the tubular component 6 to the bearing inner ring 31 is realized by an antenna connection to the bearing inner ring 31.

LIST OF REFERENCE SYMBOLS 1, 1' Transmission
2 Drive plate pair
3 Driven plate pair
4 Endless traction mechanism
5 First plate of the drive plate pair
6 Shaft section
7 Torque measurement device
8 Electronics unit
9 Inner circumferential surface
10 Outer side
11 Strain measurement layer
12 Planetary gear device
13 First tooth section
14 Second tooth section
15 First mating teeth
16 Second mating teeth
17 Gear shaft
18 Housing
19 Data transmission unit
20 Bearing
21 Connecting line
22 Driveshaft
23 Second plate of the drive plate pair
24 First plate of the driven plate pair
25 Second plate of the driven plate pair
26 Driven shaft
27 Differential
28 Fastener
29 First antenna element
30 Second antenna element
31 First bearing ring
32 Second bearing ring
33 Roller body
34 Bearing journal
35 Connecting channel
36 Inner side

The invention claimed is:

1. A transmission for a drivetrain of a motor vehicle, the transmission comprising:
   a shaft section;
   a torque measurement device mounted on the shaft section, the torque measurement device being configured to measure a torque applied to said shaft section; and
   an electronics unit connected to the torque measurement device that is housed radially inside the shaft section,
   wherein the transmission is a continuously variable transmission and further comprises a drive plate pair and a driven plate pair, and an endless traction mechanism that actively interconnects the drive plate pair and the driven plate pair, and the shaft section is locked in rotation with one of the plates of the drive plate pair.

2. The transmission according to claim 1, wherein the electronics unit is mounted on a radial inner circumferential surface of the shaft section.

3. The transmission according to claim 1, wherein the torque measurement device is mounted on a radial outer side of the shaft section and is connected electrically to the electronics unit.

4. The transmission according to claim 1, wherein the torque measurement device includes a strain measurement layer.

5. The transmission according to claim 1, wherein the shaft section is a tubular component that is locked in rotation with a gear shaft.

6. The transmission according to claim 1, wherein the shaft section is tubular and has a first tooth section that engages locked in rotation with first mating teeth on one of the plates.

7. The transmission according to claim 1, further comprising a data transmission unit arranged between a housing of the transmission and the shaft section that can rotate relative to the housing and is connected to the electronics unit.

8. A transmission for a drivetrain of a motor vehicle, the transmission comprising:
   a shaft section;
   a torque measurement device mounted on the shaft section, the torque measurement device being configured to measure a torque applied to said shaft section;
   an electronics unit connected to the torque measurement device that is housed radially inside the shaft section; and
   a data transmission unit arranged between a housing of the transmission and the shaft section that can rotate relative to the housing and is connected to the electronics unit,
   wherein the data transmission unit comprises a bearing configured for transmitting data.

9. A drivetrain for a motor vehicle comprising the transmission according to claim 1.

10. The transmission according to claim 1, wherein the electronics unit includes evaluation electronics configured to convert a measurement signal detected by the torque measurement device and corresponding to a torque applied to the shaft section into a data transmission signal that is adapted to be transmitted.

11. The transmission according to claim 6, wherein the shaft section includes a second tooth section that engages locked in rotation with second mating teeth on a gear shaft of the transmission.

12. A continuously variable transmission for a drivetrain of a motor vehicle, the transmission comprising:
- a shaft section;
- a torque sensor mounted on the shaft section, the torque sensor being configured to measure a torque applied to said shaft section; and
- an electronics unit housed radially inside the shaft section and that receives a signal from the torque sensor and is adapted to output a data transmission signal that represents a measured torque.

13. The continuously variable transmission of claim 12, further comprising a drive plate pair, a driven plate pair, and an endless traction mechanism that actively interconnects the drive plate pair and the driven plate pair, and the shaft section is locked in rotation with one of the plates of the drive plate pair.

14. The continuously variable transmission of claim 12, wherein the electronics unit is mounted on a radial inner circumferential surface of the shaft section.

15. The continuously variable transmission of claim 12, wherein the torque sensor is mounted on a radial outer side of the shaft section and is connected electrically to the electronics unit.

16. The continuously variable transmission of claim 12, further comprising a data transmission unit arranged between a housing of the transmission and the shaft section that can rotate relative to the housing and is connected to the electronics unit.

17. The continuously variable transmission of claim 16, wherein the data transmission unit comprises a bearing configured for transmitting data.

\* \* \* \* \*